Patented Oct. 21, 1947

2,429,361

UNITED STATES PATENT OFFICE 2,429,361

TREATMENT OF ALKYL KETONES

Carl B. Linn and Vladimir N. Ipatieff, Riverside, Ill., assignors to Universal Oil Products Company, Chicago, Ill., a corporation of Delaware No Drawing. Application August 28, 1944, Serial No. 551,626

10 Claims. (Cl. 260—586)

This invention relates to an improved process for converting alkyl ketones into unsaturated carbonyl compounds of higher molecular weight and also into polyalkyl benzene hydrocarbons, particularly trialkyl benzene hydrocarbons. More specifically, our invention is concerned with a method for manufacturing mesitylene, mesityl oxide, and isophorone from acetone.

An object of this invention is to provide a process for condensing alkyl ketones in the presence of a dehydrogenating catalyst.

Another object of this invention is to provide a process for condensing an alkyl ketone to give a substantial yield of polyalkyl benzene hydrocarbons.

A further object of this invention is to provide an improved process for producing mesitylene from acetone.

One specific embodiment of this invention relates to a process which comprises reacting an alkyl ketone at a temperature of from about 200° to about 450° C. in the presence of an oxide of an element selected from the members of the left-hand column of group VI of the periodic table.

Alkyl ketones utilizable in our process for producing polyalkyl benzene hydrocarbons comprise particularly the methyl ketones including acetone, methyl ethyl ketone, methyl propyl and methyl isopropyl ketones, etc. Aliphatic methyl ketones, when treated by our process, yield symmetrical trialkyl benzene hydrocarbons, the simplest of which is mesitylene, a product of the treatment of acetone. Aliphatic ketones other than the methyl ketones may also be treated by our process to form hexa-alkyl benzene hydrocarbons.

Catalysts employed in our process comprise oxides of elements selected from the members of the left-hand column of group VI of the periodic table comprising chromium, molybdenum, tungsten, and uranium. These oxides may be employed singly, in combination with one another, or composited with refractory materials or carriers such as alumina, silica, magnesia, clays, pumice, diatomaceous earth, synthetically prepared composites of silica and alumina, etc.

The process of our invention is carried out using either batch or continuous types of treatment. In one form of batch type treatment, a ketone or a ketone mixture and a catalyst of the type herein described are charged to an autoclave. Sometimes it is desirable to impose superatmospheric pressure upon the reaction mixture, by the introduction of a gas such as nitrogen. The charged autoclave is then rotated and heated at a temperature of from about 200° to about 450° C. This treatment is continued for a time sufficient that a substantial proportion of the charged ketone is converted into a polyalkyl benzene hydrocarbon such as mesitylene or an unsaturated carbonyl compound such as mesityl oxide, or isophorone. The operating conditions are chosen to favor the production of polyalkyl benzene hydrocarbons or the unsaturated ketones as desired.

It is preferable, however, to carry out the process in a continuous manner, for example, by passing a ketone or mixture of ketones through a reactor containing a granular catalyst of the type mentioned herein and maintained at a temperature of from about 200° to about 450° C. and at a pressure of from substantially atmospheric to about 200 atmospheres. The reaction products obtained from either the batch or continuous types of treatment are separated into unconverted ketone, unsaturated products such as mesityl oxide and isophorone which are obtainable from acetone, and also polyalkyl benzene hydrocarbons, of which mesitylene is representative. The recovered ketone and unsaturated products containing the carbonyl group may be recycled to the process for producing increased yields of polyalkyl benzene hydrocarbons.

The following examples are given to show results obtained in treating an alkyl ketone in the presence of a dehydrogenation catalyst at conditions adequate to convert a substantial proportion of said ketone into a trialkyl benzene hydrocarbon.

Example I

Alumina powder was mixed with 5% by weight of hydrogenated coconut oil to act as a pilling lubricant, and then the treated powder was formed into 3 x 3 mm. cylindrical pellets by means of a pilling machine. The pellets were then calcined in air at 700° C. to remove the lubricant, cooled, and immersed for ten minutes in an aqueous solution of chromic acid and magnesium chromate. The pellets so impregnated with chromic acid and magnesium chromate solution were drained to remove the excess of said solution, and they were then dried and calcined in one operation in a kiln in which the temperature was increased slowly to 700° C., held at that temperature for six hours, and then cooled to room temperature. The amount and concentration of the impregnating solution was such that analysis of the finished catalyst showed it to consist of 12% by weight of chromium sesquioxide and 2% by weight of magnesium oxide on alumina.

A sample of 60 grams (60 cc.) of the pelleted chromium oxide-magnesium oxide-alumina catalyst was placed in a steel tube of 14 mm. inside diameter maintained at 350° C. Through this tube containing the catalyst, a total of 870 grams of acetone was passed at a pressure of 70 atmospheres during a period of 20 hours. The average liquid space velocity of the acetone was 0.92. The reaction products obtained consisted of 5 grams of noncondensible gas, 11 grams of condensible gas, and 842 grams of liquid product.

The liquid product was found to contain 504 grams of unconverted acetone, 86 grams of a mixture of water and acetic acid, 51 grams of mesityl oxide, 2 grams of liquid boiling between 135° and 155° C., 59 grams of a mesitylene fraction boiling between 155° and 170° C., 7 grams of liquid boiling between 170° and 206° C., 61 grams of isophorone boiling between 206° and 220° C., and 72 grams of higher boiling liquids comprising essentially aromatic hydrocarbons of relatively high molecular weights.

Of the acetone charged, 42% by weight reacted. Upon the basis of the weight of acetone which reacted, the yields of the different products isolated were as follows: mesityl oxide, 14.0%; mesitylene, 16.1%; isophorone, 16.7%; liquid products boiling above 220° C., 19.7%; non-condensible gas, 1.4%; and condensible gas, 3.0%. Analysis of the condensible gas gave the following results: carbon dioxide, 14.6%; propylene, 3.0%; propane, 1.3%; isobutylene, 59.4%; n-butylene, 5.1%; butane, 4.5%; pentane and unconverted acetone, 12.1%.

*Example II*

Alumina pellets prepared and calcined as described in Example I were impregnated by immersion for ten minutes in an aqueous solution of ammonium molybdate. The pellets were drained to remove excess of the ammonium molybdate solution, and then dried to 10–15% volatile matter after which the dried pellets were calcined at 550° C. for two hours. The catalyst so prepared consisted of 4% by weight of molybdenum oxide, $MoO_3$, on alumina.

A sample of 54 grams (60 cc.) of the pelleted molybdenum oxide-alumina catalyst was placed in a steel tube of 14 mm. inside diameter through which 810 grams of acetone was passed during a period of twenty hours at an average liquid space velocity of 0.86. During this time the catalyst temperature was 350° C. and the operating pressure was 70 atmospheres. The product recovered consisted of 11 grams of non-condensible gas, 24 grams of condensible gas, and 775 grams of liquid product. The recovered liquid product contained 415 grams of unconverted acetone, 104 grams of a mixture of water and acetic acid, 20 grams of mesityl oxide, 16 grams of liquid boiling between 135° and 155° C., 109 grams of a mesitylene fraction boiling between 155° and 170° C., 6 grams of liquid boiling between 170° and 206° C., 24 grams of an isophorone fraction boiling between 206° and 220° C., and 80 grams of liquids boiling above 220° C. and comprising essentially aromatic hydrocarbons of relatively high molecular weights.

Of the acetone charged, 48.8% reacted giving the following yields based upon the weight of acetone which reacted; mesityl oxide, 5.1%; mesitylene, 27.6%; isophorone, 6.1%; liquids boiling above 220° C., 20.2%; non-condensible gas, 2.8%; and condensible gas, 6.1%. Analysis of the condensible gas gave the following results: carbon dioxide, 12.3 mole %; propylene, 7.8%, propane, 2.2%; isobutylene, 35.1%; n-butylene, 2.5%; butane, 3.2%; pentane, 1.7%; and unconverted acetone, 35.2%.

The character of the process of the present invention and its commercial value are evident from the preceding specification and examples, although neither section is intended to limit unduly the broad scope of the invention.

We claim as our invention:

1. A process which comprises condensing an alkyl ketone in the presence of a catalyst comprising essentially a composite of alumina and an oxide of an element selected from the members of the left-hand column of group VI of the periodic table consisting of chromium, molybdenum, tungsten, and uranium.

2. A process for producing an unsaturated carbonyl compound and a polyalkyl benzene hydrocarbon which comprises condensing an alkyl ketone at a temperature of from about 200° to about 450° C. in the presence of a catalyst comprising essentially a composite of alumina and an oxide of an element selected from the members of the left-hand column of group VI of the periodic table.

3. A process for producing an unsaturated carbonyl compound and a polyalkyl benzene hydrocarbon which comprises condensing a methyl ketone at a temperature of from about 200° to about 450° C. in the presence of a catalyst comprising essentially a composite of alumina and an oxide of an element selected from the members of the left-hand column of group VI of the periodic table.

4. The process as described in claim 2 further characterized in that said oxide comprises an oxide of chromium.

5. The process as described in claim 2 further characterized in that said oxide comprises an oxide of molybdenum.

6. The process as described in claim 2 further characterized in that said oxide comprises an oxide of tungsten.

7. A process which comprises condensing an alkyl ketone at a temperature of from about 200° to about 450° C. in the presence of a catalyst comprising essentially a composite of alumina and an oxide of an element selected from the members of the left-hand column of group VI of the periodic table.

8. A process which comprises condensing acetone at a temperature of from about 200° to about 450° C. in the presence of a catalyst comprising essentially a composite of alumina and an oxide of an element selected from the members of the left-hand column of group VI of the periodic table.

9. A process which comprises condensing acetone at a temperature of from about 200° to about 450° C. in the presence of a composite of alumina and chromium oxide.

10. A process which comprises condensing acetone at a temperature of from about 200° to about 450° C. in the presence of a composite of alumina and molybdenum oxide.

CARL B. LINN.
VLADIMIR N. IPATIEFF.

REFERENCES CITED

The following references are of record in the file of this patent:

UNITED STATES PATENTS

| Number | Name | Date |
|---|---|---|
| 1,977,178 | Dohse | Oct. 16, 1934 |

OTHER REFERENCES

Beilstein, 4th ed., vol. 1, Second Suppl., pp. 703, 793 (1941), and vol. V, Second Suppl., p. 314 (1943).

Ipatieff, Bert. Deut. Chem., vol. 59B, pp. 2035–2038 (1926).